US007133740B1

(12) United States Patent
Stenson et al.

(10) Patent No.: US 7,133,740 B1
(45) Date of Patent: Nov. 7, 2006

(54) AUTOMATED CLOSET SYSTEM AND METHODS

(76) Inventors: Joel Stenson, 3796 Harris Blvd. NW., Kennesaw, GA (US) 30144; Engle Hendricks, 3334 Pebble Hill Dr., Marietta, GA (US) 30062

( * ) Notice: Subject to any disclaimer, the term of this patent is extended or adjusted under 35 U.S.C. 154(b) by 84 days.

(21) Appl. No.: 11/034,471

(22) Filed: Jan. 13, 2005

(51) Int. Cl.
*G06F 7/00* (2006.01)

(52) U.S. Cl. .................. 700/215; 700/213; 700/214; 700/225

(58) Field of Classification Search ......... 700/213–244
See application file for complete search history.

(56) References Cited

U.S. PATENT DOCUMENTS

| | | | | |
|---|---|---|---|---|
| 5,680,528 | A * | 10/1997 | Korszun | 345/630 |
| 6,546,309 | B1 * | 4/2003 | Gazzuolo | 700/132 |
| 6,823,236 | B1 * | 11/2004 | Speckhart et al. | 700/215 |
| 6,903,756 | B1 * | 6/2005 | Giannini | 715/747 |
| 6,957,125 | B1 * | 10/2005 | Rifkin | 700/232 |
| 7,020,538 | B1 * | 3/2006 | Luhnow | 700/132 |
| 2006/0005071 | A1 * | 1/2006 | Fu | 714/5 |

* cited by examiner

*Primary Examiner*—Khoi H. Tran
(74) *Attorney, Agent, or Firm*—Kenneth W. Float

(57) ABSTRACT

Automated closet systems and related methods that use digital imagery, RFID/barcode identification of garment hangers, and computer-controlled conveyors, to provide for image-based garment storage and retrieval. Digital garment photographs are stored in a database. Hangers have a unique RFID/barcode tag and hold garments. The RFID/barcode tag of each hanger is correlated to a garment photograph to which the hanger is assigned. A storage closet has a storage conveyer on which hangers are disposed. A pickup and loading station has a conveyer coupled to the storage conveyer that is used to transfer hangers to and from the storage conveyer. A control unit, such as a wireless touchscreen, is used during storage to initiate photographing, scanning, and transfer of garments to the storage closet. During retrieval, a user searches through digital images displayed on the control unit to find a stored garment for retrieval. Selection of a particular garment identifies a particular RFID/barcode tag. The RFID/barcode tag is passed to a conveyer controller that retrieves the hanger located in the referenced location and delivers it to the pick-up station.

17 Claims, 4 Drawing Sheets

AUTOMATED CLOSET SYSTEM AND METHODS

BACKGROUND

The present invention relates generally to clothing storage systems, and more particularly, to an automated closet system.

Conveyor rack system have heretofore been used in the garment cleaning industry to hold cleaned garments for pickup by customers. Similarly, RFID tags have heretofore been used for various purposes in conjunction with garment conveyors. Photo based libraries of garments have not been used in a garment retrieval or closet system. It would be desirable to have a system that merges these technologies to provide an improved automated closet system.

SUMMARY OF THE INVENTION

The present invention comprises automated closet system and related methods wherein digital imagery, RFID/barcode identification of garment hangers, and computer-controlled garment conveyors, are integrated to provide for image-based storage and retrieval of garments. Garments that are to be transferred to a storage closet are digitally photographed, and the photographs are stored in a database on a server. Hangers are provided that each have a unique RFID/barcode tag attached to or embedded therein identifying the hanger. Utilizing software, the RFID/barcode tag of each hanger is correlated to a particular garment photograph and the corresponding designated conveyor slot to which the hanger is assigned for holding the garment.

The storage closet comprises a storage conveyor or rack on which hangers are disposed and garments are stored. A pickup and loading station, such as a reach-in closet, for example, is preferably provided that is accessed by a user to load and retrieve garments. The pickup and loading station includes a pickup conveyor that is coupled to the storage conveyor of the storage closet. The pickup conveyor transfers hangers to and from the storage conveyor. Alternatively, the storage conveyor is the primary holding location for garments that are not in transition between the pickup station and the storage conveyor.

A control unit, such as a handheld touchscreen or similar device, is provided, which is preferably wirelessly coupled to the server, and displays a catalog of digital images representative of garments that are photographed and stored in the storage closet. During the storage process, the control unit is used to initiate photographing, scanning, and transfer of garments to the storage closet.

During the retrieval process, the user searches through the catalog of digital images displayed on the control unit to find a garment for retrieval. Selection of a particular garment on the control unit identifies a particular RFID/barcode tag, or garment location. The RFID/barcode tag, or garment location, information is passed to a conveyor controller that retrieves the hanger located in the referenced location and delivers it to the pick-up station.

BRIEF DESCRIPTION OF THE DRAWINGS

The various features and advantages of the present invention may be more readily understood with reference to the following detailed description taken in conjunction with the accompanying drawing figures, wherein like reference numerals designate like structural element, and in which.

DETAILED DESCRIPTION

Figure 1:
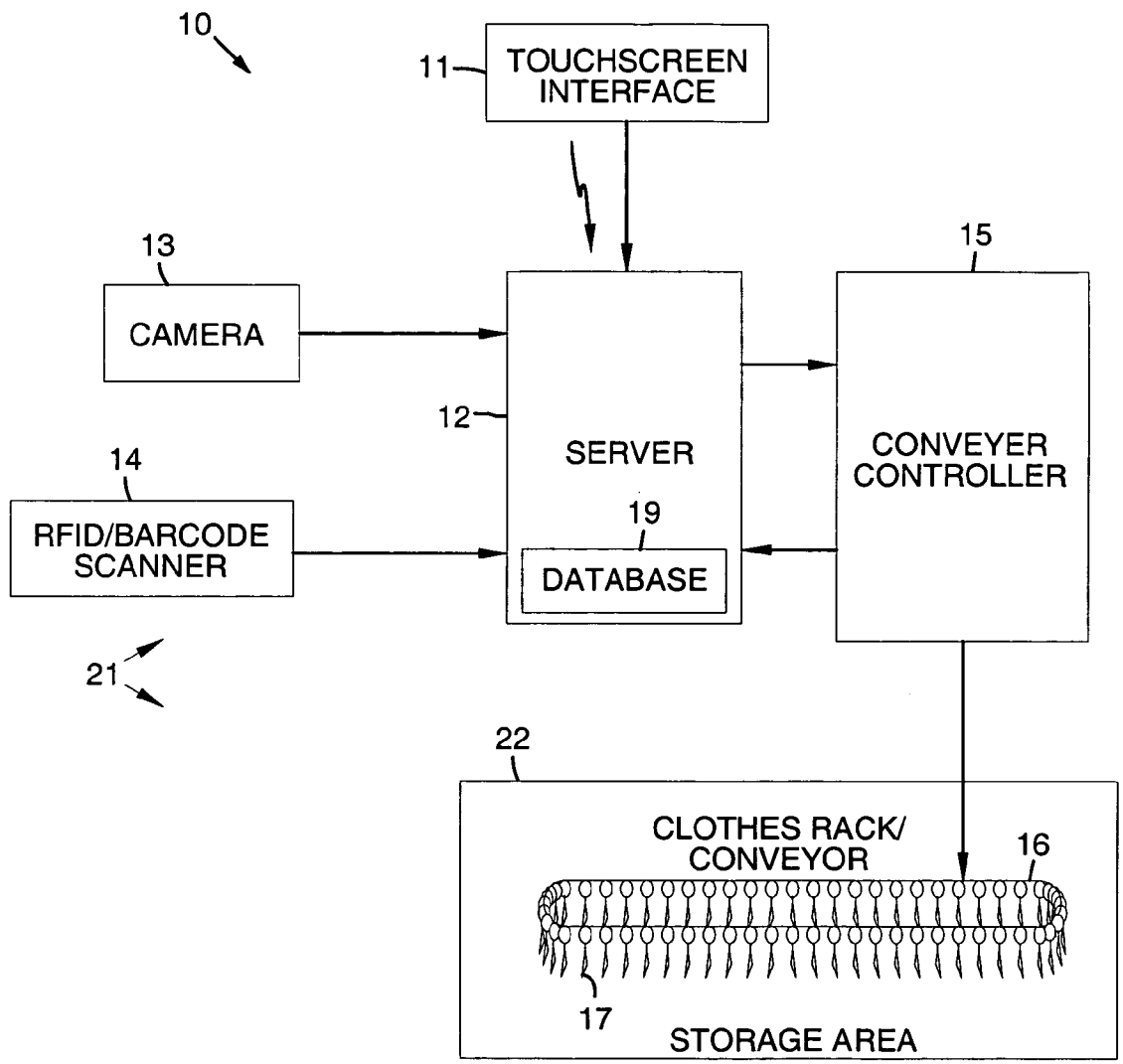
FIG. 1 is a system block diagram that illustrates an exemplary automated closet system in accordance with the principles of the present invention.

Referring to the drawing figures, FIG. 1 is a system block diagram that illustrates an exemplary automated closet system 10 in accordance with the principles of the present invention. The automated closet system 10 is designed to automatically store and retrieve items of clothing in a garment storage area 22 (closet or room) assisted by a simple handheld control unit 11, such as a touchscreen device or interface 11.

More particularly, the handheld control unit 11 (touchscreen device 11 or interface 11) is coupled to a server computer 12. A commercially available personal computer, such as those manufactured by Dell, Inc. or Hewlett-Packard Company, for example, may be employed in the system 10. The handheld control unit 11 may be wired or wireless. A wired handheld control unit 11 preferably communicates with the server computer 12 by way of an Ethernet link. The handheld control unit 11 is preferably a wireless touchscreen device 11 that provides a wireless interface 11 to the server computer 12. The wireless touchscreen device 11 preferably communicates with the server computer 12 by way of a wireless Ethernet link. Wireless touchscreen devices 11 that may be used in the system 10 are available from Elo TouchSystems, Inc., Menlo Park, Calif., for example.

The server computer 12 is coupled to a digital camera 13 that is used to take digital photographs or images of items of clothing that are to be stored. Digital cameras that may be used in the system 10 are available from Hewlett-Packard Company, Sony, and Minolta, for example. The digital camera 13 may be coupled to the server computer 12 by way of a Universal Serial Bus (USB) interface, for example, but a Firewire or other interface may be employed.

Figure 2:
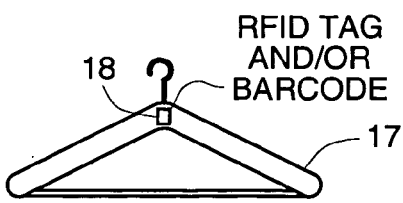
FIG. 2 illustrates an exemplary hanger used in the system shown in FIG. 1.

Each item of clothing that is placed onto a hanger 17 is digitally photographed. As is shown in FIG. 2, each hanger 17 comprises an RFID tag 18 or barcode tag 18 (referred to as an RFID/barcode tag 18) comprising a unique hanger identifier. The RFID tag 18 is either attached to or embedded in the hanger 17. The barcode tag 18 is typically attached to the hanger 17.

Preferably, hangers 17 are grouped by type, in that "His" shirts are stored on hangers 17 with RFID/barcode tags 18 in the range 100–199, "His" suits are stored on hangers 17 with RFID/barcode tags 18 in the range 200–299, and so forth. The same structure is used with "Her" hangers 17.

The server computer 12 is coupled to an RFID/barcode scanner 14. RFID scanners 14 that may be used in the system 10 are available from Printronix, Inc., Irvine, Calif., for example. Barcode scanners 14 that may be used in the system 10 are available from Symbol Technologies, Inc., Holtsville, N.Y., for example. The RFID/barcode scanner 14 is used to read the RFID tag 18 or scan the barcode tag 18 of the hangers 17. Scanning occurs during loading of garments and retrieving garments from the garment storage area 22.

Figure 3:
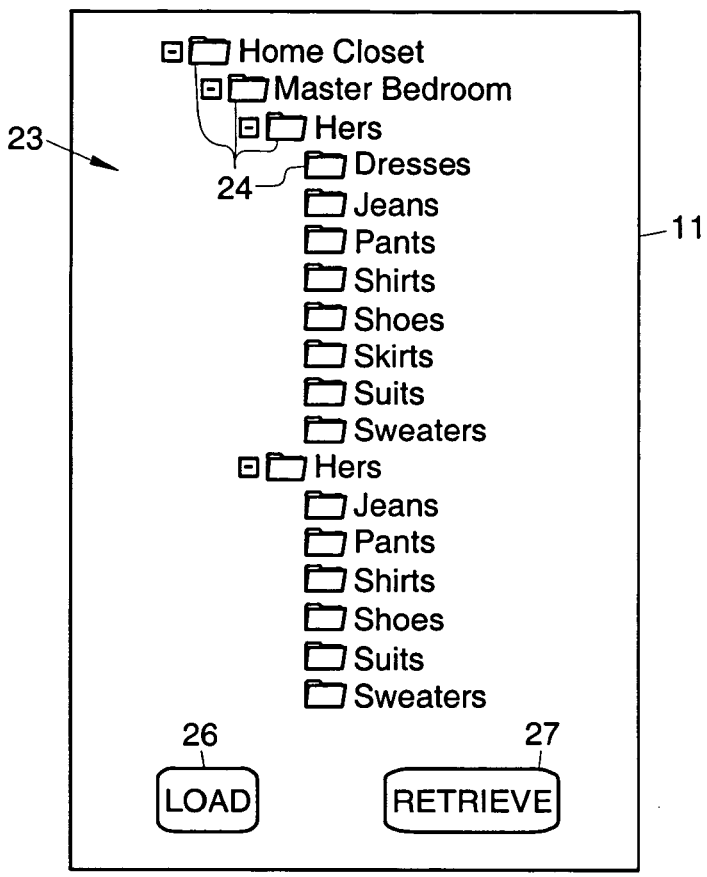
FIG. 3 illustrates a an exemplary display of a handheld control unit used in the system shown in FIG. 1.

A thumbnail image of each digital photograph is stored in the handheld control unit 11 using a menu system 23, such as is illustrated in FIG. 3. For example, as is shown in FIG. 3, the menu system 23 may display a hierarchical listing of folders 24 containing thumbnail images of "His" and "Hers" items of clothing stored in a master bedroom closet 22 (garment storage area 22). Individual sub-folders 24 under the "Hers" folder 24 are provided that contain thumbnail images of dresses, jeans, pants, shirts, shoes, skirts, suits and sweaters, for example. Similarly, individual sub-folders 24 under "His" folder 24 may contain images of jeans, pants, shirts, shoes, suits and sweaters, for example.

In addition, the menu system 23 also displays two selectable icons, for example, including a load icon 26, and a retrieve icon 27. The load icon 26 is used to initiate digital photographing of a garment and transferring a photographed and scanned garment and hanger 17 to the garment storage area 22.

Referring again to FIG. 1, the digital photographs of items of clothing are stored in a database 19 of the server computer 12. The database 19 contains file records including a selected digital photograph of an item of clothing, and the RFID tag 18 or barcode 18 of the hanger 17 on which the item of clothing is placed as well as the slot location on the conveyor 16 where the hanger 17 has been placed. Thus, there is a one-to-one correlation between a digital photograph of an item of clothing and the slot location of the conveyor 16 on which it is stored. Therefore, loading of the garment storage area 22 (closet 22) may be randomly done, in that there is no need to segregate his and her items of clothing, or load them in any particular order. However, as was mentioned above, hangers 17 are typically grouped by type, so that similar garment types (i.e., shirts, suits, etc.) are stored in predefined sections of the garment storage area 22. This allow garments to be more easily located if they must be physically located in the garment storage area 22.

The server computer 12 is coupled to a conveyor controller 15. The conveyor controller 15 is coupled to one or more garment conveyors 16, or clothes racks 16, on which hangers 17 and their respective garments are placed. Suitable conveyor 16 and conveyor controllers 15 that may be adapted for used in the system 10 are available from Metal Progetti, S.P.A., located in Perugia, Italy, for example. The number of 16, or clothes racks 16, that are employed in the system 10 depends upon the specific installation. This will be discussed in more detail with reference to FIG. 4.

Figure 4:
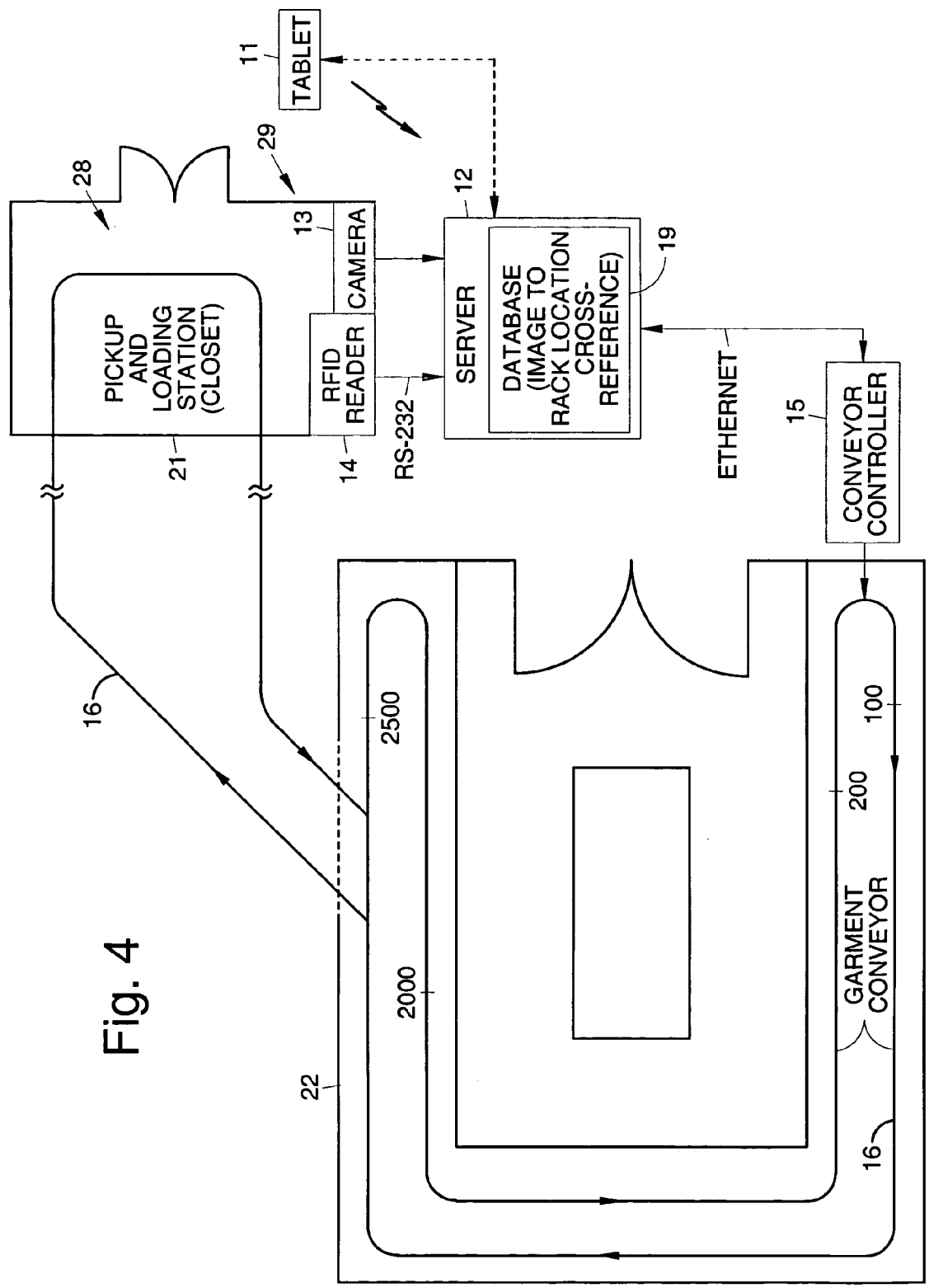
FIG. 4 illustrates details of the automated closet system.

Referring to FIG. 4, it illustrates details of the automated closet system 10. The embodiment of the automated closet system 10 shown in FIG. 4 comprises a pickup and loading station 21, which may be a reach-in closet 21, for example, which is separate from, and remotely located from, the garment storage area 22 (primary storage closet 22). The pickup and loading station 21 may be located in a dressing area of a master bedroom, while the garment storage area 22 or primary storage closet 22 may be a separate room, or may be located in an attic, for example.

The pickup and loading station 21 comprises a load area 28 where hangars 17 having garments on them are loaded. The pickup and loading station 21 also comprises a preload station 29 where the garments are digitally photographed and the RFID/barcode 18 of the hanger 17 is read.

The conveyor 16 passes through the pickup and loading station 21 and the primary storage closet 22 as a continuous loop. The path of the conveyor 16 is dependent upon the respective locations of the pickup and loading station 21 and garment storage area 22. Conveyor rack system have heretofore been used in the garment cleaning industry to hold cleaned garments for pickup by customers. Similarly, RFID tags have heretofore been used for various purposes in conjunction with garment conveyors. The use of photo based libraries of garments have not been used in conjunction with garment conveyors, and RFID/barcode scanners to store and retrieve garments, or in residential applications.

Thus, the automated closet system 10 records and stores a digital image of an item of clothing in the database 19, which is correlated with a specific RFID/barcode tag 18 of a hanger and the conveyor slot 16 on which the item of clothing is stored. Thumbnail images stored in the handheld control unit 11 (touchscreen device 11 are selected to retrieve individual items of clothing.

A desired item of clothing is retrieved by selecting the digital image of the item on the handheld control unit 11. This selection generates a signal or command that is processed to retrieve the hanger having the RFID tag and conveyor slot location associated with the selected item of clothing.

Figure 5:
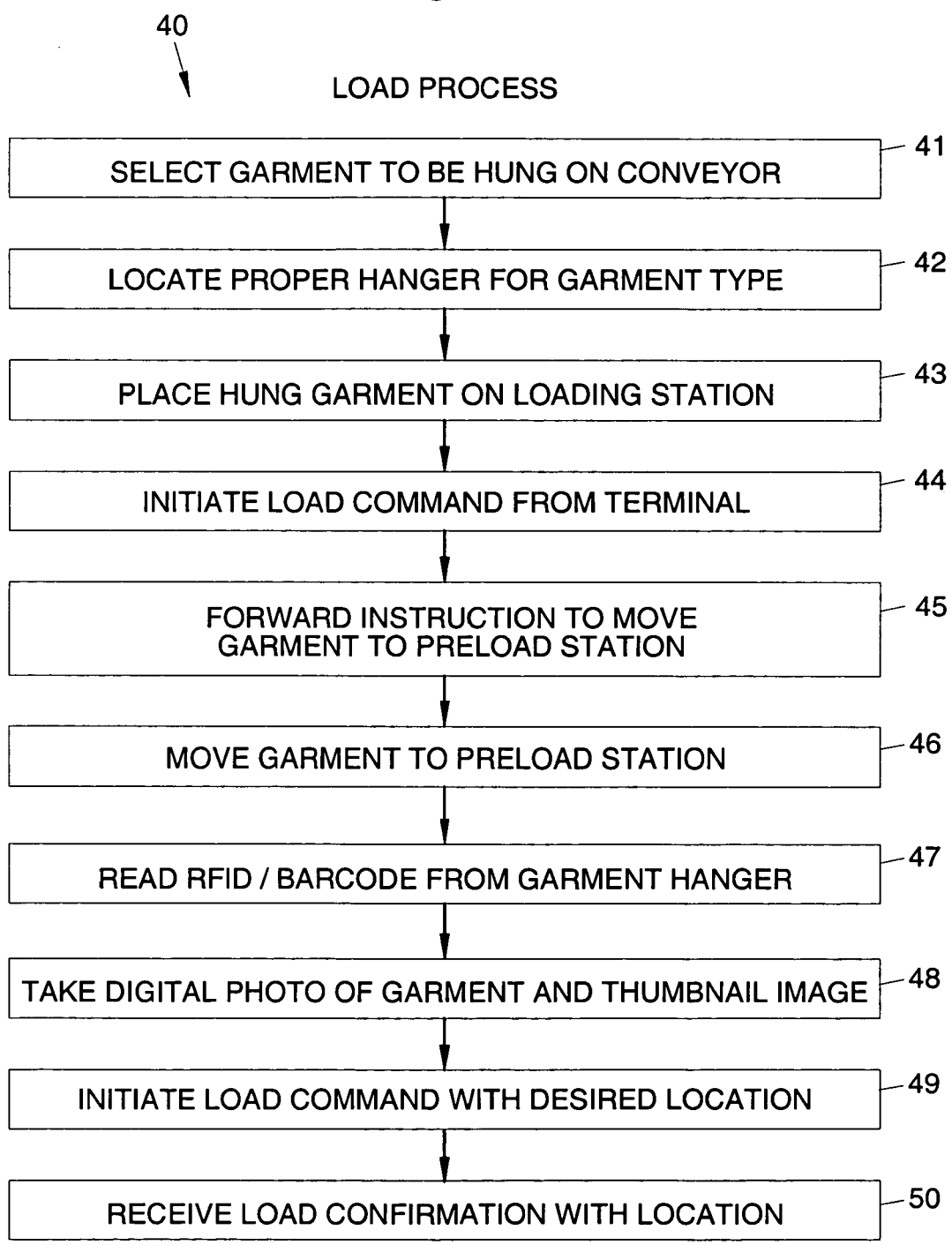
FIG. 5 is a flow diagram that illustrates an exemplary garment loading method in accordance with the principles of the present invention.

With the above in mind, FIG. 5 is a flow diagram that illustrates an exemplary garment loading method 40 in accordance with the principles of the present invention. The exemplary garment loading method 40 is as follows.

A garment that is to be stored is selected 41, say one of "His" shirts, for example. An appropriate hanger 17 for the garment type ("His" shirt) is located 42, which is a hanger 17 with an RFID/barcode tag 18 in the range 100–199, for example, and the selected garment (shirt) is hung on it The selected hanger 17 is placed 43 on the conveyor 16 passing through the pickup and loading station 21 in the load area 28.

An automatic two-phase load instruction is initiated 44 from the handheld control unit 11 (touchscreen device 11) by depressing or touching a load icon 26. The preload command or instruction is forwarded 45 from the handheld control unit 11 (touchscreen device 11) to the conveyor controller 15 by way of the server computer 12. In response to the preload command or instruction, the conveyor controller 15 causes or controls the conveyor 16 to move 46 the to the preload station 29.

Once the garment is at the preload station 29, the RFID/barcode tag 18 is read 47 from the garment hanger 17. Also, a digital photograph of the garment is taken 48 and stored in the database 19, and a thumbnail image is created and transferred to the handheld control unit 11 (touchscreen device 11).

A load command containing the desired hanger location is automatically initiated by the server computer 12. The load command is transferred to the conveyor controller 15 and causes the conveyor controller 15 to transfer the hanger 17 to the desired hanger location on the conveyer 16 in the desired range, i.e., range 100–199.

A load confirmation signal is received 50 by the conveyor controller 15 containing the hanger location. The load conformation signal is transferred by way of the server computer 12 to the handheld control unit 11 (touchscreen device 11) and is displayed to the user to indicate that the garment is stored.

Figure 6:
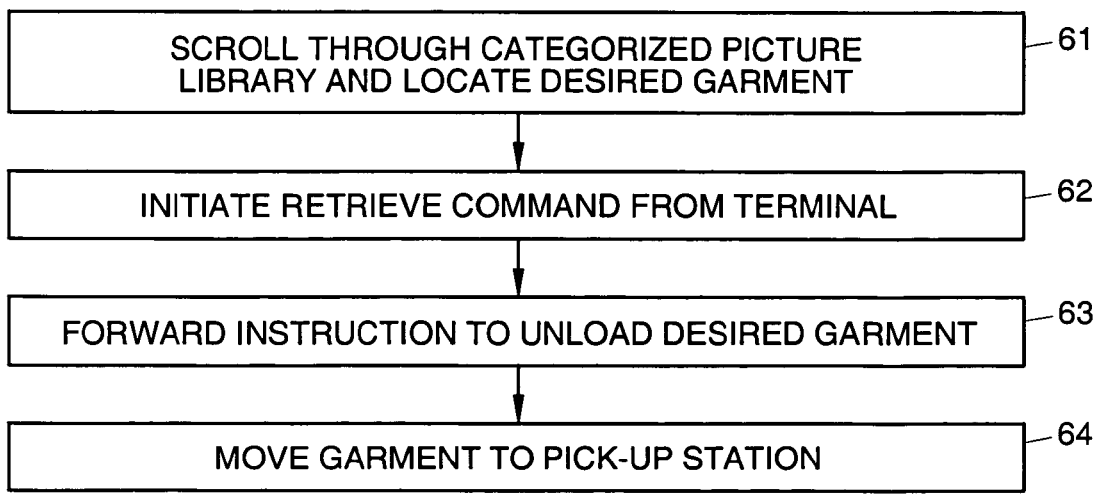
FIG. 6 a flow diagram that illustrates an exemplary garment retrieval method in accordance with the principles of the present invention.

FIG. 6 a flow diagram that illustrates an exemplary garment retrieval method 60 in accordance with the principles of the present invention. The exemplary garment retrieval method 60 is as follows.

A user looks at or scrolls through the categorized library of thumbnail images stored on the handheld control unit 11

(touchscreen device 11) and displayed in the menu system 23, and locates 61 a desired garment to be retrieved.

A retrieve command is initiated 62 on the handheld control unit 11 (touchscreen device 11) by depressing or touching a retrieve icon 27. The retrieve command is forwarded 63 or transferred 63 to the conveyor controller 15 by way of the server computer 12. The conveyor controller 15 causes the conveyer 16 to move 64 the selected garment to the pickup and loading station 21.

Thus, an automated closet system that provides for garment retrieve using selectable digital images displayed on a touchscreen or similar device has been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. An automated closet system comprising:
   a garment storage area comprising a garment conveyor comprising a movable garment rack that is operable to move through the garment storage area;
   a conveyer controller coupled to the garment conveyor;
   a server computer coupled to the conveyor controller that comprises a database for storing file records including digital photographs of garments, and identification tags of hanger on which each garment is placed;
   a digital camera coupled to the server computer for digitally photographing each garment that is to be stored;
   a scanner coupled to the server computer for reading unique hanger identifiers contained in identification tags and barcode tags associated with each hanger; and
   a control unit coupled to the server computer for storing images of each stored garment and for transmitting instructions to photograph a garment, read a hanger identification tag, load a scanned hanger holding a photographed garment in the garment storage area, and retrieve a garment selected from the stored images from the garment storage area.

2. The system recited in claim 1 further comprising:
   a pickup and loading station comprising a pickup and loading conveyor coupled to the garment conveyor.

3. The system recited in claim 1 wherein the control unit comprises a touchscreen device.

4. The system recited in claim 1 wherein the control unit is wired to the server computer.

5. The system recited in claim 4 wherein the control unit is wirelessly coupled to the server computer.

6. The system recited in claim 1 wherein the identification tags comprise RFID tags.

7. The system recited in claim 1 wherein the identification tags comprise barcode tags.

8. An automated closet system comprising:
   a garment storage area comprising a garment conveyor comprising a movable garment rack that is operable to move through the garment storage area;
   a pickup and loading station comprising a pickup and loading conveyor that is coupled to the garment conveyor;
   a conveyer controller coupled to the garment conveyor and pickup and loading conveyor;
   a server computer coupled to the conveyor controller that comprises a database for storing file records including digital photographs of garments, and identification tags of hanger on which each garment is placed;
   a digital camera disposed adjacent to the pickup and loading station and coupled to the server computer for digitally photographing each garment that is to be stored;
   a scanner disposed adjacent to the pickup and loading station and coupled to the server computer for reading unique hanger identifiers contained in identification tags and barcode tags associated with each hanger; and
   a control unit coupled to the server computer for storing images of each stored garment and for transmitting instructions to photograph a garment, read a hanger identification tag, load a scanned hanger holding a photographed garment in the garment storage area, and retrieve a garment selected from the stored images from the garment storage area.

9. The system recited in claim 8 wherein the control unit comprises a touchscreen device.

10. The system recited in claim 9 wherein the control unit is wired to the server computer.

11. The system recited in claim 9 wherein the control unit is wirelessly coupled to the server computer.

12. The system recited in claim 9 wherein the identification tags comprise RFID tags.

13. The system recited in claim 9 wherein the identification tags comprise barcode tags.

14. A method of processing garments comprising:
    selecting a hanger on which a garment is to be stored, which hanger has a unique hanger identifier;
    placing the garment on the hanger;
    disposing the selected hanger and garment on a controllable conveyor comprising a movable garment rack that is operable to move through a garment storage area;
    digitally photographing the garment;
    reading the unique hanger identifier;
    storing the digital photograph of the garment and the unique hanger identifier in a database;
    transferring the scanned hanger and garment to the garment storage area.

15. The method recited in claim 14 further comprising:
    selecting an digital photograph of a selected garment for retrieved from the storage area;
    transmitting a retrieve command identifying the selected garment;
    processing the retrieve command to determine the hanger identifier associated with the digital photograph of the selected garment; and
    processing the hanger identifier to move the selected garment out of the storage area.

16. The method recited in claim 14 further comprising:
    providing a control unit for storing digital photographs of garments that are stored in the storage area, for initiating photographing of the garment and reading of the unique hanger identifier, and for initiating transfer of the scanned hanger and garment to the storage area.

17. The method recited in claim 16 further comprising:
    selecting an digital photograph of a selected garment stored on the control unit for retrieved from the storage area;
    transmitting a retrieve command identifying the selected garment that is to be retrieved from the storage area;
    processing the retrieve command to determine the hanger identifier associated with the digital photograph of the selected garment; and
    processing the hanger identifier to move the selected garment out of the storage area.

* * * * *